(12) United States Patent
Cui et al.

(10) Patent No.: US 12,335,144 B2
(45) Date of Patent: Jun. 17, 2025

(54) ELECTRONIC DEVICE AND FLOW CONTROL METHOD FOR ELECTRONIC DEVICE

(71) Applicant: Realtek Semiconductor Corp., HsinChu (TW)

(72) Inventors: Tao Cui, Suzhou (CN); Fenglin Wang, Suzhou (CN); Mingxu Wang, Suzhou (CN); Xiaofeng Lu, Suzhou (CN)

(73) Assignee: Realtek Semiconductor Corp., HsinChu (TW)

( * ) Notice: Subject to any disclaimer, the term of this patent is extended or adjusted under 35 U.S.C. 154(b) by 255 days.

(21) Appl. No.: 18/117,480

(22) Filed: Mar. 6, 2023

(65) Prior Publication Data

US 2023/0300072 A1    Sep. 21, 2023

(30) Foreign Application Priority Data

Mar. 17, 2022  (CN) .......................... 202210264797.0

(51) Int. Cl.
*H04L 47/11* (2022.01)
*H04L 47/12* (2022.01)
*H04L 47/32* (2022.01)
*H04L 47/62* (2022.01)

(52) U.S. Cl.
CPC .............. *H04L 47/11* (2013.01); *H04L 47/12* (2013.01); *H04L 47/32* (2013.01); *H04L 47/6205* (2013.01)

(58) Field of Classification Search
CPC ......... H04L 47/11; H04L 47/12; H04L 47/32; H04L 47/6205; H04L 47/125
See application file for complete search history.

(56) References Cited

U.S. PATENT DOCUMENTS

| | | | |
|---|---|---|---|
| 6,957,270 B1* | 10/2005 | Erimli ................... | H04L 47/122 370/235 |
| 8,111,623 B2 | 2/2012 | Balandin et al. | |
| 8,565,240 B2 | 10/2013 | Kadambi | |
| 10,608,948 B1* | 3/2020 | Leib ........................ | H04L 47/26 |
| 11,146,489 B2 | 10/2021 | Hu et al. | |
| 11,153,783 B2 | 10/2021 | Gao et al. | |
| 2011/0110236 A1* | 5/2011 | Kadambi ................ | H04L 47/10 370/235 |
| 2012/0147750 A1* | 6/2012 | Pelletier ................. | H04L 47/31 370/235 |

* cited by examiner

*Primary Examiner* — Soe Hlaing
(74) *Attorney, Agent, or Firm* — Winston Hsu

(57) ABSTRACT

The invention provides an electronic device and a flow control method thereof, wherein the electronic device can transmit a specific pause frame to another electronic device, or receive a specific pause frame from the other electronic device. The specific pause frame includes a local port flow control ability and a remote port congestion status for the electronic device to perform the most appropriate processing of each received packet, or to selectively transmit a pause frame to external devices to improve the efficiency of the network system.

17 Claims, 5 Drawing Sheets

ELECTRONIC DEVICE AND FLOW CONTROL METHOD FOR ELECTRONIC DEVICE

BACKGROUND OF THE INVENTION

1. Field of the Invention

The present invention is related to flow control, and more particularly, to a flow control method for a switch and associated electronic devices.

2. Description of the Prior Art

In IEEE 803.3x specification, a pause frame is provided for being transmitted from a receiving port to a transmitting port in response to the network being congested, to notify the transmitting port of pausing transmitting packets to relieve the congestion. In addition, the transmitting port needs to wait until a pause time indicated by the pause frame expires or the receiving port transmits another packet to notify that it can continue to receive packets, before the transmitting port can resume transmitting the packets to the receiving port. However, with the expansion of required capacity of a switch, a system where multiple switches are connected with each other is gradually developed (e.g., a cascade switch system or a stacking switch system), and the above-mentioned mechanism of utilizing the pause frame to perform flow control will cause head-of-line (HOL) blocking, which affects performance of the switch.

For example, consider a case where it is assumed that the cascade switch system includes a first switch and a second switch that are connected to each other, wherein the first switch has a first port and a second port, the second switch also has a first port and a second port, and flow limitation of the first port and the second port of the second switch is 100 Mbps and 1000 Mbps, respectively. If an external device transmits multiple packets with flow that is equal to 1000 Mbps to the first port and the second port of the second switch through the first port and the second port of the first switch, respectively, since an amount of data that is required to be processed by the first port of the second switch is larger than its flow limitation, the second switch needs to transmit a pause frame to the first switch, to notify the first switch of pausing transmitting the packets to the second switch. As this moment, the first switch will also transmit the pause frame to the external device through its first port and second port, to request the external device to pause transmitting the packets to the first switch. As mentioned above, since the congestion of the first port with lower flow limitation in the second switch will cause the two ports of the first switch to be unable to receive the packets, the efficiency of the cascade switch system will be affected.

SUMMARY OF THE INVENTION

It is therefore an objective of the present invention to provide a flow control method for a switch, which can avoid utilizing flow control mechanism of the pause frame in the IEEE 803.3x specification between two switches, to address the above-mentioned problems.

According to an embodiment of the present invention, an electronic device is provided. The electronic device includes a first port, a second port, a processing circuit, and a transceiver circuit, wherein the first port is capable of connecting to a first external device, the second port is capable of connecting to a second external device, the transceiver circuit is capable of connecting to another electronic device through a cable, and the processing circuit transmits a specific pause frame to said another electronic device through the transceiver circuit. The specific pause frame includes at least one of a local port flow control ability and a remote port congestion status, wherein the local port flow control ability includes information that indicates whether the first external device and the second external device have flow control ability, and the remote port congestion status includes congestion status of the electronic device that is caused by multiple packets from said another electronic device.

According to another embodiment of the present invention, an electronic device is provided. The electronic device includes a first port, a second port, a processing circuit, and a transceiver circuit, wherein the first port is capable of connecting to a first external device, the second port is capable of connecting to a second external device, and the transceiver circuit is capable of connecting to another electronic device through a cable. The another electronic device includes a third port and a fourth port, wherein the third port is capable of connecting to a third external device, and the fourth port is capable of connecting to a fourth external device. The processing circuit receives a specific pause frame from said another electronic device through the transceiver circuit, and the specific pause frame includes at least one of a local port flow control ability and a remote port congestion status, wherein the local port flow control ability includes information that indicates whether the third external device and the fourth external device have flow control ability, and the remote port congestion status includes congestion status of said another electronic device that is caused by multiple packets from the electronic device.

According to another embodiment of the present invention, a flow control method for an electronic device is provided, wherein the electronic device includes a first port and a second port, the first port is capable of connecting to a first external device, the second port is capable of connecting to a second external device, the electronic device connects to another electronic device through a cable, said another electronic device includes a third port and a fourth port, the third port is capable of connecting to a third external device, and the fourth port is capable of connecting to a fourth external device The flow control method includes: receiving a specific pause frame from said another electronic device, wherein the specific pause frame includes at least one of a local port flow control ability and a remote port congestion status, the local port flow control ability includes information that indicates whether the third external device and the fourth external device have flow control ability, and the remote port congestion status includes congestion status of said another electronic device that is caused by multiple packets from the electronic device.

One of the benefits of the present invention is that, since the electronic device of the present invention can obtain the information that indicates whether ports of another electronic device have the flow control ability and the congestion status of said another electronic device caused by the packets from ports of the electronic device through the specific pause frame from said another electronic device, the processing circuit in the electronic device can perform the most appropriate processing upon each packet from said another electronic device according to the information and the congestion status, and can selectively transmit the pause frame to one of the external devices that are connected to the ports of the electronic device according to the information and the congestion status. As a result, the efficiency of the network system can be improved.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
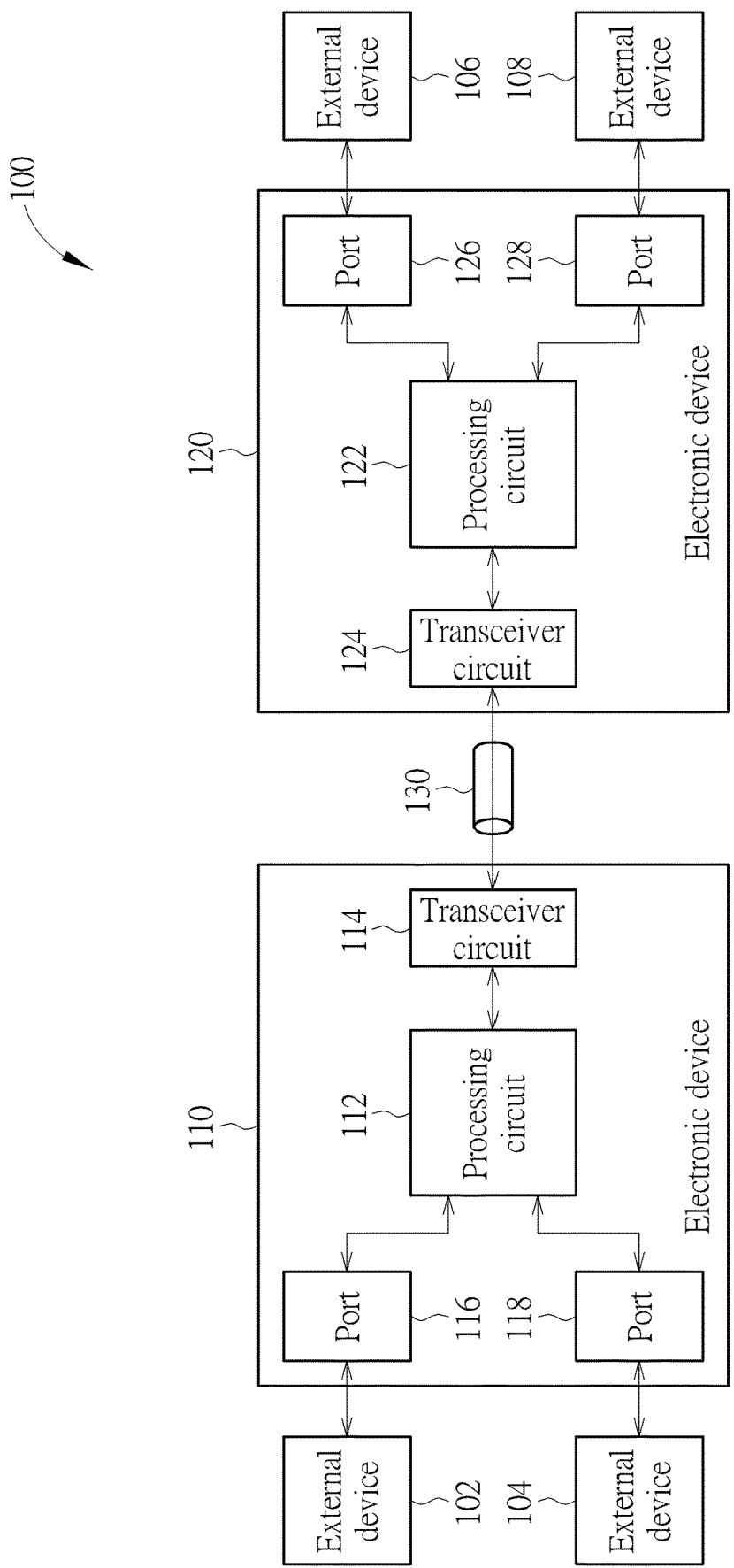
FIG. 1 is a diagram illustrating a network system according to an embodiment of the present invention.

FIG. 1 is a diagram illustrating a network system 100 according to an embodiment of the present invention. As shown in FIG. 1, the network system 100 may include electronic devices 110 and 120, wherein the electronic devices 110 and 120 are connected to each other through a cable 130 for data reception and data transmission. In this embodiment, the electronic devices 110 and 120 support Full-Duplex Ethernet, and support IEEE 802.3x specification. The electronic device 110 may include a processing circuit 112, a transceiver circuit 114, and multiple ports (e.g., ports 116 and 118), wherein the transceiver circuit 114 may be arranged to perform communications with the electronic device 120 through the cable 130, and the ports 116 and 118 may be arranged to connect to two external devices 102 and 104, respectively. The electronic device 120 may include a processing circuit 122, a transceiver circuit 124, and multiple ports (e.g., ports 126 and 128), wherein the transceiver circuit 124 may be arranged to perform communications with the electronic device 110 through the cable 130, and the ports 126 and 128 may be arranged to connect to two external devices 106 and 108, respectively.

In this embodiment, each of the electronic devices 110 and 120 may be any electronic device that utilizes network to perform data reception and data transmission, such as a switch or a router. For example, each of the electronic devices 110 and 120 may be a switch chip that is disposed on a circuit board (i.e., each of the electronic devices 110 and 120 is a cascade switch), and the cable 130 is the trace routed on the circuit board. For another example, each of the electronic devices 110 and 120 may be a switch (i.e., each of the electronic devices 110 and 120 is a stacking switch), and the cable 130 is an Ethernet line. In this embodiment, each of the electronic devices 110 and 120 is a link partner that is arranged to assist the external devices 102 and 104 to communicate with the external devices 106 and 108.

In operations of the network system 100, the external devices 102 and 104 perform communications with the external devices 106 and 108 through the electronic devices 110 and 120. For example, if the external device 102 needs to transmit packets to the external device 106, the processing circuit 112 in the electronic device 110 may receive the packets from the external device 102 through the port 116, and transmit the received packets to a packet buffer (not shown) in the electronic device 120 through the transceiver circuit 114, the cable 130, and the transceiver circuit 124. Afterwards, the processing circuit 122 may transmit the packets in the packet buffer to the external device 106 through the port 126. Similarly, if the external device 104 needs to transmit packets to the external device 108, the processing circuit 112 in the electronic device 110 may receive the packets from the external device 104 through the port 118, and transmit the received packets to the packet buffer in the electronic device 120 through the transceiver circuit 114, the cable 130, and the transceiver circuit 124. Afterwards, the processing circuit 122 may transmit the packets in the packet buffer to the external device 108 through the port 128.

In the prior art, if the flow of the packets transmitted by the external device 102 is higher than the flow limitation of the port 126 (which makes an amount of data in the packet buffer of the electronic device 120 too high), the electronic device 120 will transmit a pause frame to the electronic device 110, so that the electronic device 110 transmits the pause frame to the external devices 102 and 104 through the ports 116 and 118, to request the external devices 102 and 104 to pause transmitting the packets to the electronic device 110. Since the network system 100 will cause all ports of the electronic device 110 to be unable to receive the packets from the external devices because the flow of a single port of the electronic device 120 exceeds the flow limitation, the efficiency of the network system 100 will seriously be affected. To address this problem, the present invention provides a flow control technique for the network system 100 that can make the electronic devices 110 and 120 communicate with each other to indicate the current flow control ability and congestion status of the ports.

Figure 2:
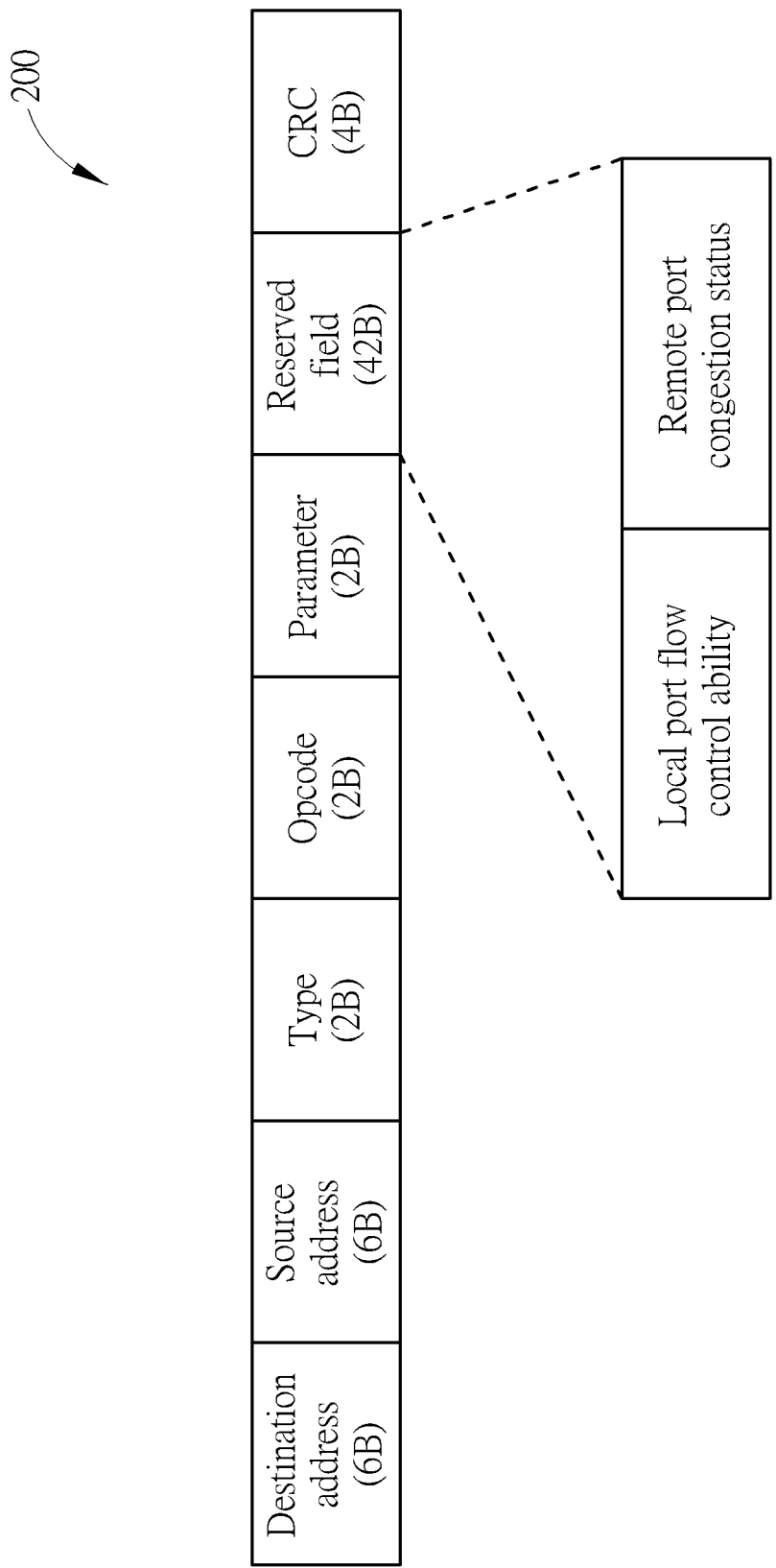
FIG. 2 is a diagram illustrating a specific pause frame according to an embodiment of the present invention.

Specifically, please refer to FIG. 2. FIG. 2 is a diagram illustrating a specific pause frame 200 according to an embodiment of the present invention, wherein the format of the specific pause frame 200 conforms to the IEEE 802.3x specification. As shown in FIG. 2, the specific pause frame 200 may include multiple fields, and the multiple fields may include a destination address with 6 bytes, a source address with 6 bytes, a frame type with 2 bytes, an opcode with 2 bytes, a reserved field with 42 bytes, and a cyclic redundancy check code with 4 bytes. In this embodiment of the present invention, the reserved field may include a local port flow control ability and a remote port congestion status. It should be noted that, since the focus of this embodiment is the information carried by the reserved field in the specific pause frame 200, and the contents and definitions of the remaining fields can be referred to the IEEE 802.3x specification, the following embodiments mainly describe the local port flow control ability and the remote port congestion status contained in the reserved field.

The specific pause frame 200 shown in FIG. 2 is utilized for communications between the electronic devices 110 and 120. For example, the electronic device 110 may transmit the specific pause frame 200 to the electronic device 120. At this moment, the local port flow control ability contained in the reserved field of the specific pause frame 200 is information that indicates whether the external devices 102 and 104 connected to the ports 116 and 118 support the pause frame in the IEEE 802.3x specification. In detail, since the flow control ability of each port is obtained through negotiation between the electronic device 110 and the external devices 102 and 104, respectively, if the port 116 has the flow control ability, it means that the external device 102 can receive data from the electronic device 110 and support the IEEE 802.3x specification, to pause transmitting the packets to the electronic device 110; and if the port 118 does not have the flow control ability, it means that the external device 104 will not pause transmitting the packets to the electronic device 110 in spite of reception of the pause frame.

In other words, the specific pause frame 200 can make the electronic device 120 obtain and store the information that indicates whether the ports 116 and 118 of the electronic device 110 have the flow control ability. In addition, when the electronic device 110 transmits the specific pause frame 200 to the electronic device 120, the remote port congestion status contained in the reserved field of the specific pause frame 200 is the congestion status of the electronic device 110 caused by the packets from the ports 126 and 128 of the electronic device 120. In detail, since the packet buffer in the electronic device 110 will temporarily store the packets from the ports 126 and 128 of the electronic device 120, and each packet will carry the source information (i.e., the packet is from the port 126 or the port 128), the processing circuit 112 can generate the congest status corresponding to the ports 126 and 128 according to the packet information from the ports 126 and 128 (e.g., packet count/throughput), and transmit the congestion status to the electronic device 120 through the specific pause frame 200. In other words, the specific pause frame 200 can make the electronic device 120 aware of the congestion status of the electronic device 110 caused by the packets from the ports 126 and 128.

Similarly, the electronic device 120 may also transmit the specific frame 200 to the electronic device 110, to make the electronic device 110 obtain the information that indicates whether the ports 126 and 128 have the flow control ability, and make the electronic device 110 aware of the congestion status of the electronic device 120 caused by the packets from the ports 116 and 118.

Figure 3:
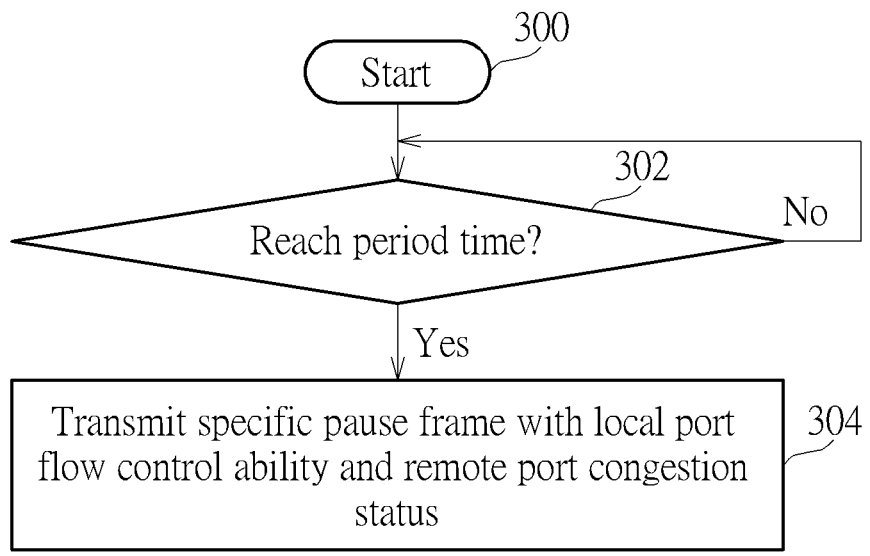
FIG. 3 is a flow chart of transmitting a specific pause frame from an electronic device to another electronic device according to an embodiment of the present invention.

Regarding the specific pause frame 200, it may be transmitted periodically, or may be transmitted when the local port flow control ability changes, and/or may be transmitted when the remote port congestion status changes. Specifically, please refer to FIG. 3. FIG. 3 is a flow chart of transmitting the specific pause frame 200 from the electronic device 110 to the electronic device 120 according to an embodiment of the present invention.

In Step 300, the flow starts, and a connection and initialization operation of the electronic devices 110 and 120 is completed.

In Step 302, the electronic device 110 determines whether a period time for transmitting the specific pause frame 200 has been reached. If yes, Step 304 is entered; if no, Step 302 is returned.

In Step 304, the electronic device 110 transmits the specific pause frame 200 with the local port flow control ability and the remote port congestion status to the electronic device 120.

Figure 4:
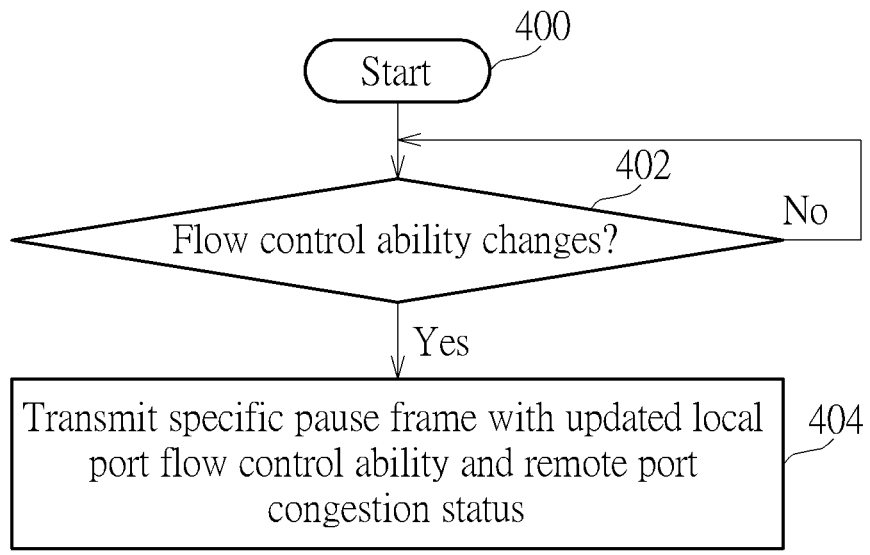
FIG. 4 is a flow chart of transmitting a specific pause frame from an electronic device to another electronic device according to another embodiment of the present invention.

FIG. 4 is a flow chart of transmitting the specific pause frame 200 from the electronic device 110 to the electronic device 120 according to another embodiment of the present invention.

In Step 400, the flow starts, and a connection and initialization operation of the electronic devices 110 and 120 is completed.

In Step 402, the electronic device 110 determines whether the flow control ability of the port 116 or the flow control ability of the port 118 changes (e.g., the external device 102 connected to the port 116 is changed from supporting the pause frame of the IEEE 802.3x specification to not supporting the pause frame of the IEEE 802.3x specification). If yes, Step 404 is entered; if no, Step 402 is returned.

In Step 404, the electronic device 110 transmits the specific pause frame 200 with the updated local port flow control ability and the remote port congestion status to the electronic device 120.

Figure 5:
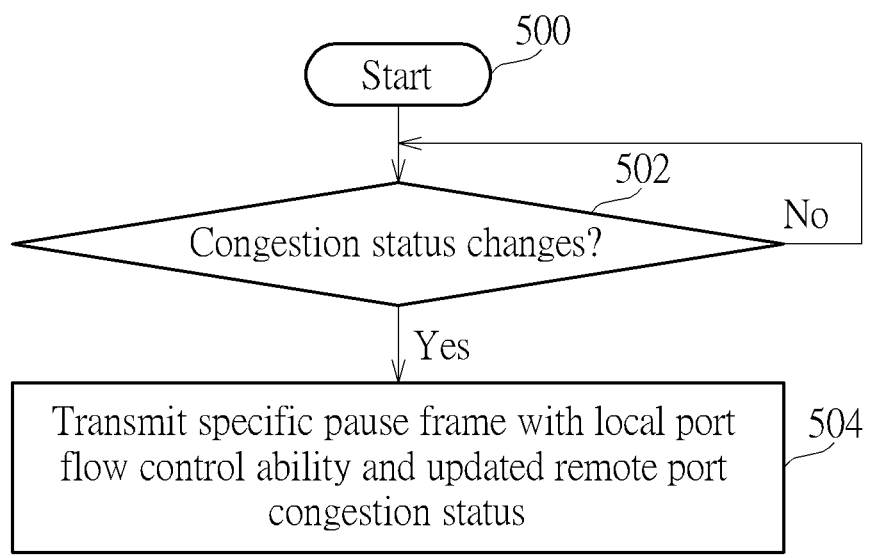
FIG. 5 is a flow chart of transmitting a specific pause frame from an electronic device to another electronic device according to yet another embodiment of the present invention.

FIG. 5 is a flow chart of transmitting the specific pause frame 200 from the electronic device 110 to the electronic device 120 according to yet another embodiment of the present invention.

In Step 500, the flow starts, and a connection and initialization operation of the electronic devices 110 and 120 is completed.

In Step 502, the electronic device 110 determines whether the congestion status of the electronic device 110 caused by the packets from the ports 126 and 128 of the electronic device 120 changes (e.g., the number of packets from the port 126 of the electronic device 120 increases from below a first threshold value to above a second threshold value). If yes, Step 504 is entered; if no, Step 502 is returned.

In Step 504, the electronic device 110 transmits the specific pause frame 200 with the local port flow control ability and the updated remote port congestion status to the electronic device 120.

It should be noted that the above flows of FIG. 3, FIG. 4, and FIG. 5 may also be applicable to transmitting the specific pause frame 200 from the electronic device 120 to the electronic device 110, and the flows of FIG. 3, FIG. 4, and FIG. 5 may also be utilized in combination.

As mentioned above, by utilizing the specific pause frame 200, the electronic devices 110 and 120 can obtain the information that indicates whether each port of the other side has the flow control ability and the congestion status of the other side caused by the flow of its own ports, for further use in flow control.

Specifically, consider a case where it is assumed that the external device 102 transmits the packets to the external device 106 through the electronic devices 110 and 120. When the electronic device 120 transmits the specific pause frame 200 to the electronic device 110, to notify that the packets from the port 116 cause congestion to the electronic device 120, the processing circuit 112 in the electronic device 110 can transmit the pause frame to the external device 102, to request the external device 102 to pause transmitting the packets. Similarly, consider another case where it is assumed that the external device 106 transmits the packets to the external device 102 through the electronic devices 110 and 120. When the electronic device 110 transmits the specific pause frame 200 to the electronic device 120, to notify that the packets from the port 126 cause congestion to the electronic device 110, the processing circuit 122 in the electronic device 120 can transmit the pause frame to the external device 106, to request the external device 106 to pause transmitting the packets.

Figure 6:
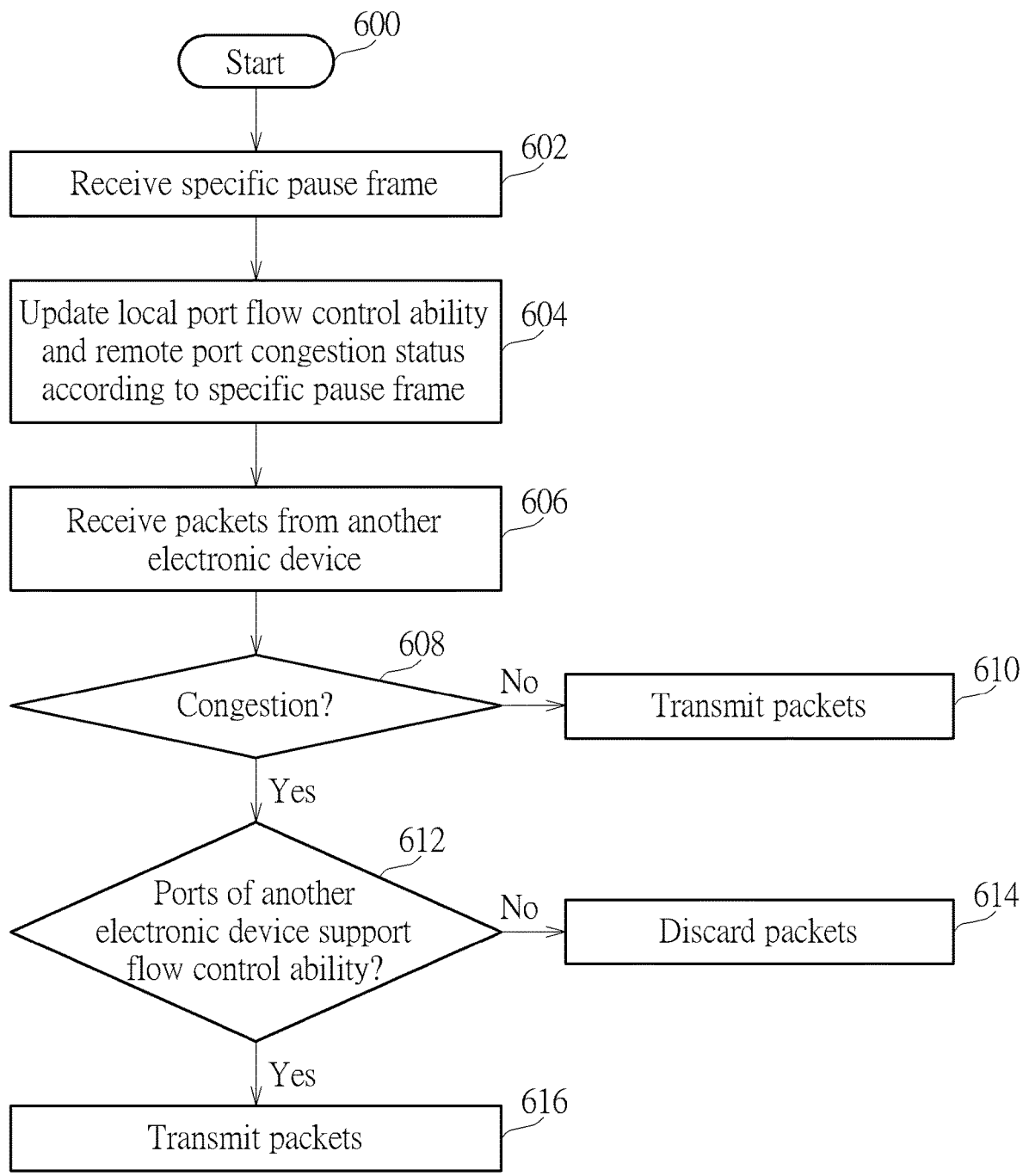
FIG. 6 is a flow chart of a flow control method according to an embodiment of the present invention.

FIG. 6 is a flow chart of a flow control method according to an embodiment of the present invention.

In Step 600, the flow starts, and a connection and initialization operation of the electronic devices 110 and 120 is completed.

In Step 602, the electronic device 110 receives the specific pause frame 200 from the electronic device 120, wherein the specific pause frame 200 includes the local port flow control ability and the remote port congestion status, the local port flow control ability indicates whether the ports 126 and 128 of the electronic device 120 have the flow control ability, and the remote port congestion status indicates the congestion status of the electronic device 120 caused by the packets from the ports 116 and 118.

In Step 604, the processing circuit 112 receives the specific pause frame 200, and stores the local port flow control ability and the remote port congestion status provided by the specific pause frame 200, or updates the previously stored local port flow control ability and remote port congestion status according to the currently received pause frame 200.

In Step 606, the electronic device 120 receives packets from the external devices 106 and 108 through the ports 126 and 128, respectively, and transmits the packets to the electronic device 110.

In Step 608, the electronic device 110 determines whether the congestion occurs (i.e., whether the number of packets contained in the internal packet buffer is too large or exceeds a threshold value). If no, Step 610 is entered; if yes, Step 612 is entered.

In Step 610, the processing circuit 112 directly transmits the packets from the electronic device 120 to the external device 102 and/or the external device 104.

In Step 612, the processing circuit 112 determines whether the ports 126 and 128 of the electronic device 120 have the flow control ability according to the previously stored local port flow control ability. If no, Step 614 is entered; if yes, Step 616 is entered.

It should be noted that the operation of Step 612 is performed for each port of the electronic device 120. For example, if the port 126 of the electronic device 120 does not have the flow control ability, Step 614 is entered to process the packets from the port 126 and the external device 106; and if the port 128 of the electronic device 120 has the flow control ability, Step 616 is entered to process the packets from the port 128 and the external device 108.

In Step 614, the processing circuit 112 discards the packets from the port 126/128. For example, in a case where it is assumed that the port 126 of the electronic device 120 does not have the flow control ability, the processing circuit 112 will directly discard the packets from the external device 106 that are currently and temporarily stored in the packet buffer, instead of transmitting them to the external devices 102 and 104.

In Step 616, the processing circuit 112 directly transmits the packets from the electronic device 120 to the external device 102 and/or the external device 104.

It should be noted that the above flow of FIG. 6 may also be applicable to the electronic device 120 that receives the specific pause frame 200 from the electronic device 110, and the flow control for the packets from the electronic device 110. Since a person skilled in the pertinent art can readily understand details of the steps after reading above paragraphs, further description is omitted here for brevity.

As mentioned above, since the electronic device 110 can obtain the information that indicates whether the ports 126 and 128 of the electronic device 120 have the flow control ability and the congestion status of the electronic device 120 caused by the packets from the ports 116 and 118 through the specific pause frame 200 from the electronic device 120, the processing circuit 112 in the electronic device 110 can perform the most appropriate processing upon each packet from the electronic device 120 according to the information and the congestion status, and can selectively transmit the pause frame to one of the external devices 102 and 104 according to the information and the congestion status. As a result, the efficiency of the network system 100 can be improved.

It should be noted that, in the above embodiments, the specific pause frame includes the local port flow control ability and the remote port congestion status, but the present invention is not limited thereto. In other embodiments, the specific pause frame 200 may only include one of the local port flow control ability and the remote port congestion status, and the processing circuit 112 in the electronic device 110 can perform the most appropriate processing upon each packet from the electronic device 120 according to the local port flow control ability provided by the electronic device 120, or the processing circuit 112 in the electronic device 110 can selectively transmit the pause frame to one of the external devices 102 and 104 according to the remote port congestion status provided by the electronic device 120. In this way, the efficiency of the network system 100 can also be improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A electronic device, comprising:
    a first port and a second port, wherein the first port is capable of connecting to a first external device, and the second port is capable of connecting to a second external device;
    a processing circuit; and
    a transceiver circuit, being capable of connecting to another electronic device through a cable;
    wherein the processing circuit transmits a specific pause frame to said another electronic device through the transceiver circuit, the specific pause frame comprises at least one of a local port flow control ability and a remote port congestion status, the local port flow control ability comprises information that indicates whether the first external device and the second external device have flow control ability, and the remote port congestion status comprises congestion status of the electronic device that is caused by multiple packets from said another electronic device.

2. The electronic device of claim 1, wherein the specific pause frame comprises the local port flow control ability and the remote port congestion status.

3. The electronic device of claim 1, wherein the local port flow control ability comprises information that indicates whether the first external device and the second external device are capable of pausing transmitting multiple packets to the electronic device according to a pause frame, and the remote port congestion status comprises information that indicates whether the multiple packets from said another electronic device cause congestion to the electronic device.

4. The electronic device of claim 1, wherein the processing circuit periodically transmits the specific pause frame to said another electronic device through the transceiver circuit, or transmits the specific pause frame to said another electronic device in response to a change of the local port flow control ability, or transmits the specific pause frame to said another electronic device in response to a change of the remote port congestion status.

5. The electronic device of claim 1, wherein the electronic device and said another electronic device form a cascade switch system or a stacking switch system.

6. A electronic device, comprising:
a first port and a second port, wherein the first port is capable of connecting to a first external device, and the second port is capable of connecting to a second external device;
a processing circuit; and
a transceiver circuit, being capable of connecting to another electronic device through a cable, wherein said another electronic device comprises a third port and a fourth port, the third port is capable of connecting to a third external device, and the fourth port is capable of connecting to a fourth external device;
wherein the processing circuit receives a specific pause frame from said another electronic device through the transceiver circuit, the specific pause frame comprises at least one of a local port flow control ability and a remote port congestion status, the local port flow control ability comprises information that indicates whether the third external device and the fourth external device have flow control ability, and the remote port congestion status comprises congestion status of said another electronic device that is caused by multiple packets from the electronic device.

7. The electronic device of claim 6, wherein the specific pause frame comprises the local port flow control ability and the remote port congestion status.

8. The electronic device of claim 6, wherein the local port flow control ability comprises information that indicates whether the third external device and the fourth external device are capable of pausing transmitting multiple packets to said another electronic device according to a pause frame, and the remote port congestion status comprises information that indicates whether the multiple packets from the electronic device cause congestion to said another electronic device.

9. The electronic device of claim 6, wherein the specific pause frame comprises the remote port congestion status, the processing circuit receives a first packet from the first external device through the first port, the first packet is prepared to be transmitted to the third external device through said another electronic device, the processing circuit determines whether multiple packets from the first port of the electronic device cause congestion to said another electronic device according to the remote port congestion status, and in response to the multiple packets from the first port of the electronic device causing congestion to said another electronic device, the processing circuit transmits a pause frame to the first external device through the first port, to request the first external device to pause transmitting the multiple packets.

10. The electronic device of claim 6, wherein the specific pause frame comprises the local port flow control ability; the processing circuit receives a second packet from the third port through said another electronic device, the second packet is prepared to be transmitted to the first external device, the processing circuit determines whether the electronic device is congested; in response to the electronic device being congested, the processing circuit determines whether the third port or the third external device has flow control ability according to the local port flow control ability; in response to the third port or the third external device having flow control ability, the processing circuit directly transmits the second packet to the first external device; and in response to the third port or the third external device not having flow control ability, the processing circuit directly discards the second packet.

11. The electronic device of claim 6, wherein the electronic device and said another electronic device form a cascade switch system or a stacking switch system.

12. A flow control method for an electronic device, wherein the electronic device comprises a first port and a second port, the first port is capable of connecting to a first external device, the second port is capable of connecting to a second external device, the electronic device connects to another electronic device through a cable, said another electronic device comprises a third port and a fourth port, the third port is capable of connecting to a third external device, and the fourth port is capable of connecting to a fourth external device; the flow control method comprising:
receiving a specific pause frame from said another electronic device, wherein the specific pause frame comprises at least one of a local port flow control ability and a remote port congestion status, the local port flow control ability comprises information that indicates whether the third external device and the fourth external device have flow control ability, and the remote port congestion status comprises congestion status of said another electronic device that is caused by multiple packets from the electronic device.

13. The flow control method of claim 12, wherein the specific pause frame comprises the local port flow control ability and the remote port congestion status.

14. The flow control method of claim 12, wherein the local port flow control ability comprises information that indicates whether the third external device and the fourth external device are capable of pausing transmitting multiple packets to said another electronic device according to a pause frame, and the remote port congestion status comprises information that indicates whether the multiple packets from the electronic device cause congestion to said another electronic device.

15. The flow control method of claim 12, wherein the specific pause frame comprises the remote port congestion status, and the flow control method further comprises:
receiving a first packet from the first external device through the first port, wherein the first packet is prepared to be transmitted to the third external device through said another electronic device;
determining whether multiple packets from the first port of the electronic device cause congestion to said another electronic device according to the remote port congestion status; and
in response to the multiple packets from the first port of the electronic device causing congestion to said another electronic device, transmitting a pause frame to the first external device through the first port, to request the first external device to pause transmitting the multiple packets.

16. The flow control method of claim 12, wherein the specific pause frame comprises the local port flow control ability, and the flow control method further comprises:
receiving a second packet from the third port through said another electronic device, wherein the second packet is prepared to be transmitted to the first external device;
determining whether the electronic device is congested;
in response to the electronic device being congested, determining whether the third port or the third external device has flow control ability according to the local port flow control ability;
in response to the third port or the third external device having flow control ability, directly transmitting the second packet to the first external device; and in response to the third port or the third external device not having flow control ability, directly discarding the second packet.

17. The flow control method of claim 12, wherein the electronic device and said another electronic device form a cascade switch system or a stacking switch system.

\* \* \* \* \*